Oct. 17, 1961    B. L. COLLINS    3,004,340
KITCHEN UTENSIL
Filed Sept. 24, 1959
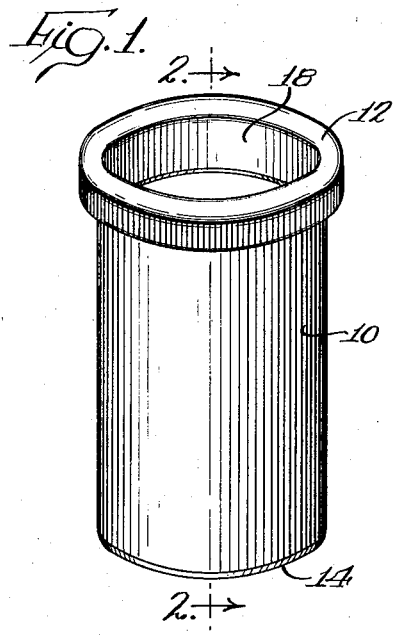
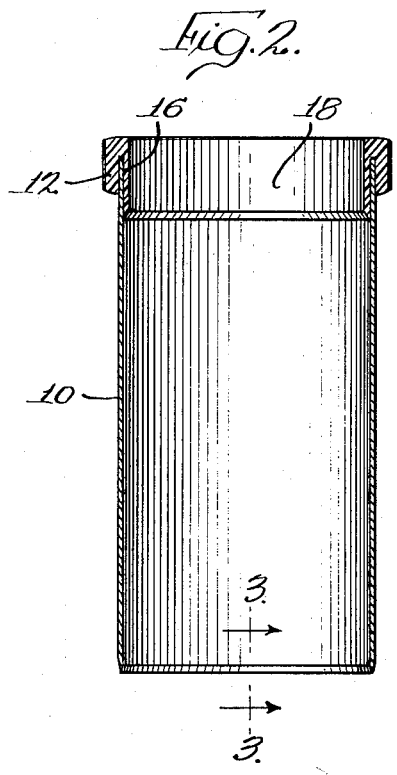
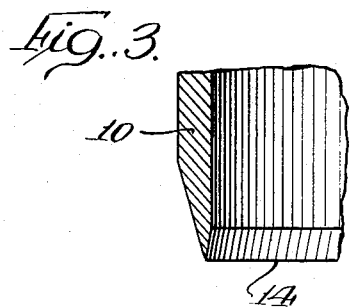
INVENTOR.
Bernice L. Collins
BY
Brown, Jackson, Boettcher & Dienner
Attys.

United States Patent Office 3,004,340
Patented Oct. 17, 1961

1

3,004,340
KITCHEN UTENSIL
Bernice L. Collins, 211 17th St., Wilmette, Ill.
Filed Sept. 24, 1959, Ser. No. 842,046
2 Claims. (Cl. 30—316)

The present invention relates to kitchen utensils, and particularly, to an improved hand operated utensil for cutting, slicing, chopping, mixing and blending foods, food mixtures and food ingredients. The utensil has a wide variety of uses including chopping vegetables, slicing vegetables such as celery and carrots, simultaneously chopping and mixing the ingredients for salads, mixing the ingredients for food mixtures such as meatloaf, blending the ingredients for cakes and pastries, and so on.

Bearing these uses in mind, it is the object of the present invention to provide a single utensil of economical manufacture and simplified construction that is exceptionally convenient to use, that performs all of the stated functions and more, and that is easy to clean and keep in a sanitary condition.

More particularly, it is the object of the invention to provide an improved hand manipulated kitchen utensil consisting essentially of an elongate open-ended rigid cylinder having a beveled and sharpened end portion defining a circular cutting edge at one edge thereof, and circular means at its other end facilitating grasping of the cylinder and exertion by the palm of the user's hand of a uniform force over the entirety of the said cutting edge.

Specifically, it is the object of the invention to provide an improved hand manipulated kitchen utensil consisting simply of an open-ended rigid stainless steel cylinder approximately two inches in diameter and about four inches long having imperforate smooth interior and exterior surfaces, one end of the cylinder being beveled internally and externally to define a sharp circular cutting edge at one end of the cylinder, and a cylindrical plastic hand grip of short length slipped onto the other end of the cylinder to facilitate manipulation of the cylinder by the palm portion of the user's hand.

The tool as thus formed affords the advantages of simplicity, economy and ease of manipulation; it is readily cleaned and maintained in sanitary condition; it presents an exceptionally large cutting edge, especially for its size; it is readily inserted into bowls and pans to perform its work in the container within which the food is to be cooked or served; because of its length it has a great capacity for food, it can be used to chop, mix and blend batches of food and food ingredients having appreciable depth, and it can be used in deep bowls and pans without subjecting the user's hands to injury or entry into the food; the hand grip facilitates a firm grasp on the utensil and affords a cushion for the palm and fingers of the user's hand to prevent injury and to render use of the utensil comfortable; and the utensil is readily manipulated for performance of the many functions above stated.

These and other objects and advantages of the invention will become apparent in the following detailed description.

Now, in order to acquaint those skilled in the art with the manner of making and using the improved kitchen utensil of my invention, I shall described, in connection with the accompanying drawing, a preferred embodiment of my utensil, the preferred manner of making the same and preferred manners of using the same.

In the drawing:

FIGURE 1 is a perspective view of my improved utensil;

FIGURE 2 is a vertical section of the utensil; and

FIGURE 3 is an enlarged fragmentary detail view, taken substantially on line 3—3 of FIGURE 2, showing the cutting edge of the tool.

As illustrated, the utensil consists simply of a cylindrical body 10 and a cylindrical hand grip 12. The body preferably comprises a rigid cylinder approximately two inches in diameter and four inches long, formed of the non-magnetic stainless steel that has been approved for use in connection with milk, eggs and dairy products. Being formed of this material, the utensil will not taint or discolor the foods with which it is brought in contact. The body is suitably made by cutting a stainless steel tube into four inch lengths, the cut being made perpendicular to the axis of the tube to define planar end surfaces on the cylinder. A suitable standard size of tube has an inner diameter of 1.930 inches and a wall thickness of .035 inch. The wall of the tube or cylinder is continuous (usually having a welded seam) and imperforate, and the tube has perfectly smooth interior and exterior surfaces free from cracks and crevices.

I have adopted the dimensions specified for the reasons, among others, that the same afford a utensil of maximum efficiency for use in home kitchens, and at the same time one that is sufficiently small to be conveniently manipulated, cleaned and stored. The specified diameter facilitates a woman's grasp on the utensil, entry of the utensil into the cooking and preparing vessels customarily found in home kitchens, even into the smallest sauce pans, and manipulation of the tool along the edges of such vessels whether they be round, square, or oblong. Also, this diameter facilitates preparation of small as well as large batches of food. The four inch length facilitates use of the utensil in bowls and pans, and serves to keep the user's hand above the pan or bowl and above the food or food ingredients therein. Because of its size, food particles do not tend to accumulate within the utensil and simply tumble out when the utensil is raised. This renders the utensil very easily cleaned. Since the body is open-ended and has no cracks, crevices or apertures therein, it is conveniently washed by hand or machine and is very readily maintained sanitary.

At the lower end thereof, the cylinder is beveled internally and externally to define a sharp circular cutting edge 14 which lies in a plane perpendicular to the axis of the cylinder. Preferably, a bevel of about $3/16$ of an inch is provided externally and a finish bevel of about $1/16$ of an inch is provided internally, thereby to insure an exceptionally sharp edge, and also an edge that will not push food away from the edge during cutting, and especially during slicing. The cutting edge thus defined is six and one-quarter inches long and perfectly planar so that the entirety of the edge may be utilized at one time to perform an exceptionally efficient cutting action. This length of simultaneously available cutting edge is considerably greater than the available edge length even of a knife, so that the utensil of this invention is considerably more efficient for performance of work than other known utensils.

The hand grip 12 comprises a cylindrical member formed of plastic, such as polyethylene. The member preferably is approximately $5/8$ of an inch long and has an inner diameter of about 1.85 inches and an outer diameter of about two and one-quarter inches. Intermediate its inner and outer walls, the member is provided with an annular recess 16 into which the steel cylinder is adapted to be slipped. The frictional engagement between the two causes the hand grip to be tightly held to the steel cylinder, but not so tightly that the hand grip cannot be removed to facilitate cleaning. Preferably, the hand grip has an internal sleeve 18 insertable into the cylinder and having an internal bevel at its lower end so as to eliminate definition of an obstruction or a crevice. Outwardly of the annular recess therein, the hand grip is preferably shortened to about $3/8$ of an inch and is provided with beveled upper and lower surfaces and a serrated peripheral wall thereby to facilitate a firm grip on the utensil and to provide a resilient cushion for protecting the user's hand and for rendering the utensil comfortable to use. As thus formed, the hand grip in no way detracts from, and in fact complements, the cylinder form of the body 10, thereby to facilitate application of uniform pressure from the palm of the user's hand to the entirety of the circular cutting edge, and also to facilitate cleaning of the utensil.

The described utensil affords the housewife an economical and easily used utensil having myriad uses. In fact, the utensil provides a fresh approach in the preparation of foods. For example, in making a vegetable salad, the more solid ingredients, such as radishes, celery, onions and cucumber, are put into the serving bowl first. The housewife simply inserts the utensil vertically into the bowl with the cutting edge down and reciprocates the utensil up and down within the bowl simultaneously to chop and intermix the vegetables. The amount of vertical reciprocation of the utensil will determine the size of the vegetable particles in the completed salad, the particles becoming smaller with repeated reciprocation. Due to the length of the cutting edge 14, the vegetables will be quickly chopped to desired size, and the cylindrical shape of the article facilitates chopping of the vegetables even at the extreme edges of the bowl. Due to the character of the cutting edge, the vegetables are precisely cut by the utensil and are not mashed. After the more solid ingredients are chopped to desired size, the leafy greens such as lettuce are added along with the salad dressing, salt or other condiments. A few quick strokes of the utensil and the leafy ingredients are cut to proper size and intermingled with all other ingredients and condiments. The resultant product is a crisp salad comprised of cut chunks or particles of the vegetables. A similar process is used to prepare chicken salad or egg salad within the serving bowl, the housewife chopping the vegetables first to desired size and then chopping and blending the chicken or eggs into the mixture. In manipulating the utensil, the housewife has a comfortable grasp on the hand grip 12 with the palm of her hand overlying the interior of the utensil. Her palm is thus disposed to exert uniform pressure over the entire cutting edge to assure accomplishment of the results specified. At the same time, her hand is so spaced above the ingredients of the salad that her hand does not come in contact with the same. The utensil is completely non-clogging, despite the depth and character of the ingredients in which it is working, since the size of the cylinder does not admit of firm retention of the ingredients. Normally, the cylinder is cleared simply by lifting it out of the ingredients. If some particles remain in the cylinder, a slight shaking will clear the cylinder. Thus, the salad is made in considerably less time and with considerably less effort than is usually involved. Only a single utensil is employed and the housewife is not required to handle the vegetables repeatedly, or to soil her hands with the juices from the ingredients.

Similarly, cooked potatoes may quickly be chopped for hash browning, whole canned tomatoes may be finely chopped for spaghetti sauce, other foods may be chopped to desired size, mixtures of foods may be readily chopped to size and thoroughly intermixed all in one operation, and the ingredients of other food products, such as cakes, pastries, preserves and jams may be quickly and thoroughly blended with a few vertical strokes of the utensil. Also, the utensil may be used in an obvious manner as a cookie or biscuit cutter.

A further use of my improved utensil is for the slicing of food and/or the cutting of the same to desired size. By way of example, carrots are frequently served in chunk style and sliced. For preparing uniform chunks and/or slices of carrot, I employ my utensil as follows: Holding the utensil in the hand in the usual manner, the cutting edge is placed on the cutting surface, such as a chopping board or block, and the utensil is tilted, using the portion of the cutting edge at one side of the utensil as a fulcrum. A carrot is then placed flat on the cutting surface to extend diametrically of the utensil and generally perpendicular to the edge portion of the utensil serving as the fulcrum. The carrot is then inserted the desired distance under the elevated edge portion of the utensil and the utensil is rocked about its fulcrum to bring its cutting edge flat against the cutting surface, whereby a chunk or slice is cut from the carrot. The utensil is then rocked back to its tilted position and the carrot is slid forwardly the desired distance, whereupon the utensil is again rocked forwardly to its upright position to cut another chunk or slice from the carrot. For a right-handed person, it is most convenient to hold the utensil in the right hand and to manipulate the carrot with the left hand, the utensil being tilted to the right and rocked toward the left to effect the cut. In this manner, carrots, celery and other foods can be quickly and accurately sliced or cut to desired size by oscillatory movement of the utensil about the described fulcrum. As slicing or cutting takes place, each cut piece is prevented from flying off the cutting board due to its confinement by the cylinder, and the cut pieces or slices thus accumulate within the utensil. When a number of slices have been accumulated, the same may conveniently be moved out of the slicing area simply by sliding the utensil, with its cutting edge flat against the cutting surface, across the surface to an area removed a few inches from the cutting area, elevating the utensil to leave the slices in their removed location, and returning the utensil to the cutting or slicing position.

In view of the foregoing, it is to be appreciated that the present invention provides an exceptionally efficient hand utensil for performing myriad functions in the preparation of food, including the cutting, slicing, chopping, mixing and blending of foods, food mixtures and ingredients of food products. The utensil is low in cost and designed for lifetime service, and has a cutting edge that may readily be re-sharpened if necessary. Thus, all of the objects and advantages of the invention have been shown herein to be attained in a convenient, economical and practical manner.

While I have shown and described what I regard to be the preferred embodiment of my invention, it will be appreciated that various changes, rearrangements and modifications may be made therein without departing from the scope of the invention, as defined by the appended claims.

I claim:

1. A hand manipulated kitchen utensil consisting exclusively of an open-ended rigid tubular cylinder having imperforate smooth interior and exterior surfaces, the ends of said cylinder being planar and perpendicular to the axis of said cylinder, one end of said cylinder being beveled internally and externally and defining a sharp circular planar cutting edge at said one end thereof, and a cushion member of short length fitted onto the other end of said cylinder, said cushion member comprising a resilient annulus having an annular axially extending recess therein of radial dimensions equal substantially to those of said cylinder and of a depth significantly less than the height of the annulus, said other end of said cylinder having a firm intimate frictional fit within said recess, said cushion member having a relatively long thin cylindrical wall portion interiorly of said recess fitted intimately into the interior of said cylinder, a relatively thick short wall portion exteriorly of said recess intimately engaging the exterior surface of said cylinder and having a serrated peripheral edge, and a planar annular end surface of relatively large area the plane of which is perpendicular to the axis of the cylinder, said serrated exterior wall portion facilitating grasping of the utensil by the user's fingers with the palm of the user's hand overlying the opening through the utensil and said annular end surface of said cushion member whereby the user may exert by the palm of his hand a uniform force over the entirety of said circular cutting edge.

2. A utensil as set forth in claim 1, wherein said cylindrical wall portion interiorly of said recess is beveled at its lower edge to merge with the interior surface of said cylinder.

References Cited in the file of this patent

UNITED STATES PATENTS

| | | |
|---|---|---|
| 534,570 | Norris | Feb. 19, 1895 |
| 606,511 | Buckles | June 28, 1898 |
| 865,628 | Carsley | Sept. 10, 1907 |
| 978,790 | Thomas | Dec. 13, 1910 |
| 1,632,227 | Halsey | June 14, 1927 |
| 1,848,985 | Yahn | Mar. 8, 1932 |
| 2,370,650 | Fitzsimmons | Mar. 6, 1945 |

FOREIGN PATENTS

| | | |
|---|---|---|
| 788,641 | France | July 29, 1935 |